(No Model.)
D. E. HOUSER & G. C. HOBROCK.
WATER HEATER.
No. 555,245. Patented Feb. 25, 1896.
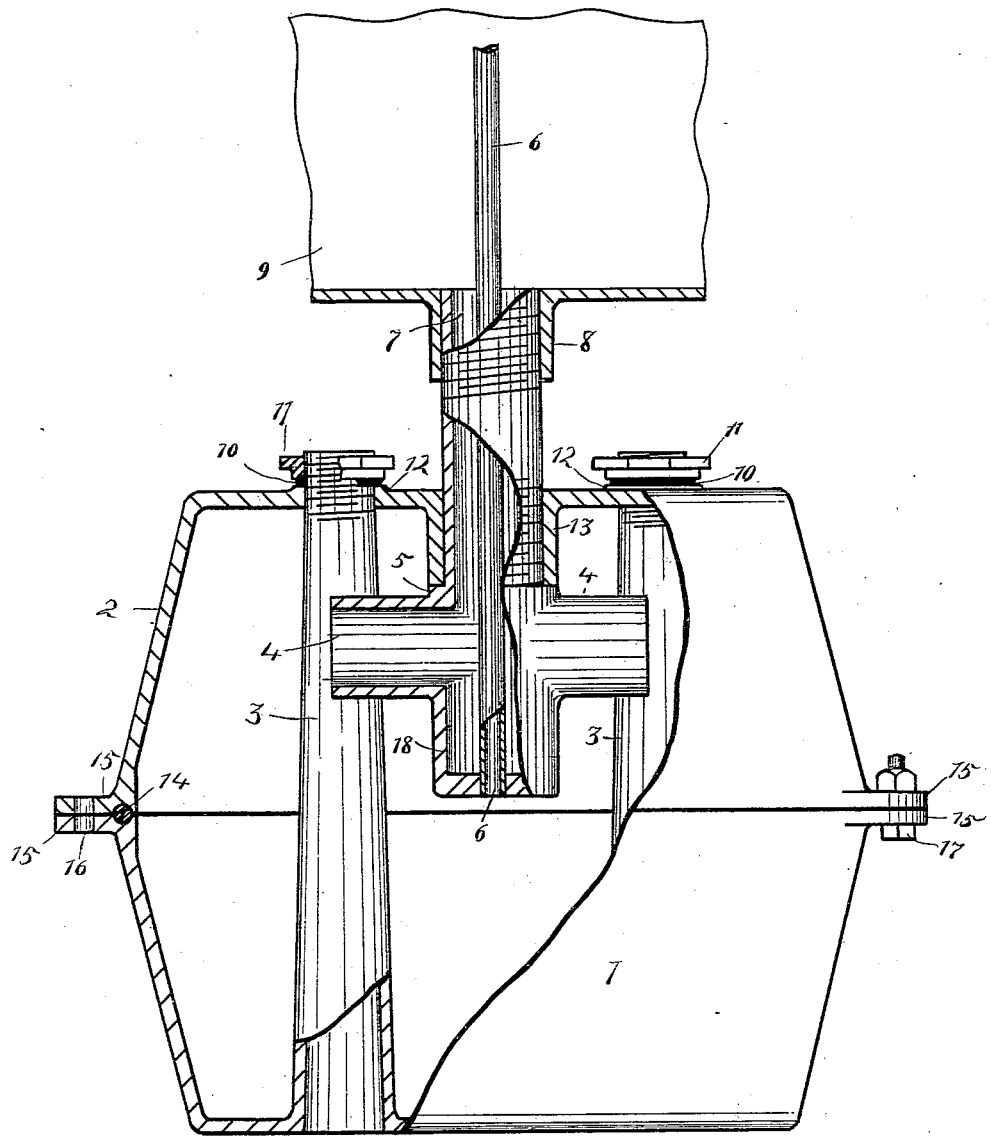
WITNESSES: David E. Houser
and Gustav C. Hobrock INVENTORS
BY Chapin & Denny
their ATTORNEYS

UNITED STATES PATENT OFFICE.

DAVID E. HOUSER AND GUSTAVE C. HOBROCK, OF FORT WAYNE, INDIANA.

WATER-HEATER.

SPECIFICATION forming part of Letters Patent No. 555,245, dated February 25, 1896.

Application filed August 16, 1895. Serial No. 559,445. (No model.)

*To all whom it may concern:*

Be it known that we, DAVID E. HOUSER and GUSTAVE C. HOBROCK, citizens of the United States, residing at Fort Wayne, in the county of Allen, in the State of Indiana, have invented certain new and useful Improvements in Water-Heaters; and we do hereby declare that the following is a full, clear, and exact description of the invention, which will enable others skilled in the art to which it appertains to make and use the same, reference being had to the accompanying drawings, which form part of this specification.

Our invention relates to improvements in water-heaters.

It is well known that the water-heaters now in common use have their parts either brazed or else secured together by a screw-threaded connection, and that when so constructed they cannot be taken apart when access to the interior thereof is desirable for cleaning and repairs without the necessity of sending them to the factory where special machinery is provided for that purpose. It is also well known that when the parts of the heater or furnace shell are brazed and the interior thereof becomes thickly coated with lime and other accumulations, the water being thus kept away from direct contact with the heater, the brazing is liable to become melted and the heating shell or tank thereby rendered unfit for use.

The object, therefore, of our invention is to provide an improved water heater or tank of simple and economical construction by which the water can be more quickly heated, so arranged that its two-part casing can be readily detached by the mere novice to obtain access to the interior for cleaning and repairs by the simple use of an ordinary wrench, and yet is so arranged that when in position it is perfectly secure under all conditions of ordinary usage.

Our invention consists of a metallic shell or casing formed by two approximately equal parts, detachably secured together when in use by a series of holding or binding bolts and having its lower detachable section provided with a series of integral internal upright tubular flues, open at both ends for the admission of the heat for the purpose of securing an increased heating-surface, the said heating-flues being arranged to pass out of the heating shell or casing.

The novel feature of our invention consists in the construction whereby the portions of the casing or heating-shell can readily be detached or disconnected for cleaning or repairs and in the arrangement of the upright heating-flues.

Similar reference-numerals indicate corresponding parts.

The accompanying drawing is a view in elevation of our improved heater connected to a water-tank and partly cut away in section to show its general construction and arrangement of parts.

The metallic casing is composed of two approximately equal parts 1 and 2, of the usual form, and are secured together by a series of threaded bolts 17, mounted in a series of radial perforated integral lugs 16 and 15 respectively. The meeting faces of each of the said portions 1 and 2 are provided with an annular coincident recess adapted to receive and tightly contain the packing 14, of any suitable material, and by means of which the joint at their meeting faces is water-tight. The lower half-casing 1 is provided upon its base with a series of integral upright tubular flues 3, preferably three in number, open at both ends and adapted to extend upward through suitable openings in the top of the casing 2, as shown, for the purpose of providing an increased heating-surface in contact with the water in the shell. The upper end of the said flues is externally screw-threaded and provided with a screw-threaded collar 11, between which and the annular boss 12 is interposed a suitable packing-ring 10, thereby rendering the joint water-tight. The closed top of the said portion 2 is provided with a central opening having an integral depending internally-screw-threaded collar 13, adapted to receive the central screw-threaded portion of the feed-pipe 7, the lower face of said collar abutting against the upper face of the annular shoulder 5 on said pipe when in position, between which faces an interposed washer may be provided, if desired, though in practice it is not necessary. The upper end of the said pipe 7 is also externally screw-threaded and is adapted to fit the depending internally-screw-threaded flange 8 of any proper water-tank 9. The lower end 18 of the said supply-pipe 7 is closed, but has a central perforation in which the lower end of the vertical discharge-pipe 6 is properly fixed or secured. The pipe 6 leads to the upper portion of the said tank in the usual and well-understood manner. The lower portion of the said pipe 7 is also provided with the usual radial discharge-openings 4.

The operation of our improvement thus described will readily be understood. The bolts 17 in their respective radial lugs, together with the packing-ring 14, rigidly secure the detachable portions of the said casing in a water-tight condition, and when the heat is applied at the base thereof it will freely ascend through the said flues, thereby increasing the heating-surface and heating the water in the said tank more quickly and economically than when the said flues are not provided. The discharge of the heated water through the pipe 6 into the tank 9, and the cold-water supply therefrom, is effected in the usual and well-understood manner. It is obvious that when it is desired for any purpose to detach the said portions 1 and 2 of the heating shell or casing it can readily be done by removing the bolts 17, the collars 11, and the washers 10, after which the flues 3 can be conveniently removed from their loose connection in the top of the upper portion of the shell.

Having thus described our invention and the manner of employing the same, what we desire to secure by Letters Patent is—

1. A hot-water heater consisting of a two-part tank detachably connected by a series of holding-bolts arranged as described, the upper section 2 being provided with the inlet-pipe 6 and the discharge-pipe 7, arranged as shown, and the lower section 1 being provided with a plurality of upright heating-flues 3 open at both ends and provided at their upper protruding ends with a screw-threaded clamping-nut adapted to form a water-tight joint, all substantially as described.

2. In a hot-water heater the combination of a two-part casing detachably connected by a series of holding-bolts, as shown, and provided with a plurality of integral vertical flues 3 projecting through the top thereof and surmounted by clamping-nuts 11 and the packing-rings 10 for the purpose specified, and a screw-threaded supply-pipe 7 mounted as shown in the top of said casing having proper radial discharge-ports 4 and provided with an inner vertical discharge-pipe 6 leading to the supply-tank, all substantially as and for the purpose described.

Signed by us at Fort Wayne, Allen county, State of Indiana, this 13th day of August, A. D. 1895.

DAVID E. HOUSER.
GUSTAVE C. HOBROCK.

Witnesses:
C. J. McLAIN,
P. L. ZORBAUGH.